(12) United States Patent
Seo et al.

(10) Patent No.: US 10,274,083 B2
(45) Date of Patent: Apr. 30, 2019

(54) CONNECTOR

(71) Applicant: GM GLOBAL TECHNOLOGY OPERATIONS LLC, Detroit, MI (US)

(72) Inventors: Young Min Seo, Seoul (KR); Choong Hee Rhew, Gyeonggi-do (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 15/305,059

(22) PCT Filed: Mar. 26, 2015

(86) PCT No.: PCT/KR2015/002990
§ 371 (c)(1),
(2) Date: Oct. 18, 2016

(87) PCT Pub. No.: WO2015/163590
PCT Pub. Date: Oct. 29, 2015

(65) Prior Publication Data
US 2017/0175887 A1  Jun. 22, 2017

(30) Foreign Application Priority Data

Apr. 25, 2014 (KR) .................. 10-2014-0049939

(51) Int. Cl.
*F16H 63/34* (2006.01)
*F16H 63/36* (2006.01)
(Continued)

(52) U.S. Cl.
CPC ............ *F16H 63/34* (2013.01); *F16D 11/14* (2013.01); *F16D 28/00* (2013.01); *F16H 63/36* (2013.01);
(Continued)

(58) Field of Classification Search
CPC .......... F16D 27/118; G05G 5/06; H01F 7/124
See application file for complete search history.

(56) References Cited

U.S. PATENT DOCUMENTS 2,583,065 A * 1/1952 Stephan ................ B23Q 15/00
74/365
4,114,465 A 9/1978 Troy
(Continued)

FOREIGN PATENT DOCUMENTS

CN  1534220 A  10/2004
CN  102192249 A  9/2011
(Continued)

OTHER PUBLICATIONS

China Patent Office, Office Action, dated May 22, 2018.

*Primary Examiner* — David R Morris
(74) *Attorney, Agent, or Firm* — McNees Wallace & Nurick LLC (57) ABSTRACT

A connector in a clutch connection structure used in an electrical automobile, which includes: a locking part formed at a body; a latch in contact with the locking part; a first solenoid driving part disposed on one side of the latch; and a second solenoid driving part disposed on the other side of the latch, in which the first solenoid driving part and the second solenoid driving part face each other with the latch being interposed therebetween, such that an operation of a clutch when the clutch operates becomes simple, and thus, noise, vibrations, and durability thereof are improved.

8 Claims, 6 Drawing Sheets

(51) Int. Cl.
 *F16D 11/14* (2006.01)
 *F16D 28/00* (2006.01)
 *F16D 11/00* (2006.01)
 *F16H 63/30* (2006.01)

(52) U.S. Cl.
 CPC ..... *B60Y 2306/09* (2013.01); *F16D 2011/006* (2013.01); *F16H 2063/3093* (2013.01); *Y02T 10/6204* (2013.01)

(56) References Cited

U.S. PATENT DOCUMENTS

| | | | |
|---|---|---|---|
| 4,179,944 A | 12/1979 | Conner | |
| 5,460,060 A | 10/1995 | Nellums | |
| 7,845,479 B2* | 12/2010 | Ochiai | F16D 13/04 192/35 |
| 8,469,854 B1* | 6/2013 | Downs | B60K 23/08 475/221 |
| 8,649,854 B2 | 2/2014 | Sepehri et al. | |
| 9,022,192 B2* | 5/2015 | Quehenberger | F16D 13/04 192/24 |
| 9,109,636 B2* | 8/2015 | Kimes | F16D 27/02 |
| 9,518,623 B2* | 12/2016 | Mastie | F16D 27/118 |
| 2008/0251344 A1 | 10/2008 | Ochiai et al. | |
| 2011/0214522 A1* | 9/2011 | Sporleder | F16D 23/06 74/339 |
| 2013/0199885 A1* | 8/2013 | Quehenberger | F16D 13/04 192/84.1 |
| 2013/0256078 A1* | 10/2013 | Kimes | F16D 27/02 192/69 |
| 2016/0265601 A1* | 9/2016 | Mastie | F16D 27/118 |

FOREIGN PATENT DOCUMENTS

| | | |
|---|---|---|
| CN | 102401116 A | 4/2012 |
| CN | 102834634 A | 12/2012 |
| DE | 4404093 C1 | 5/1995 |
| DE | 102013217470 A1 | 3/2014 |
| EP | 1464877 A2 | 10/2004 |
| JP | 2007-002959 A | 1/2007 |
| JP | 2013-040672 A | 2/2013 |

\* cited by examiner

CONNECTOR

TECHNICAL FIELD

The present disclosure relates to a connector using a ball and a detent, and more particularly, to a connector of a clutch connecting structure used in a general four-wheeled vehicle, an electrical automobile, and so on.

BACKGROUND ART

The connector is a power transmitting (or blocking) device that is provided to transmit (or block) a rotational force generated from a driving part to (or from) a constant velocity joint connected to the wheels.

The recent trend of the automobile development shows increased emphasis on the importance of the fuel efficiency, and accordingly, the concept of design is shifting toward the way of suppressing waste of power as much as possible and increasing the efficiency of the mechanical system. Among these, a power blocking and connecting disconnector is provided to prevent unnecessary waste of torque.

Figure 11A:
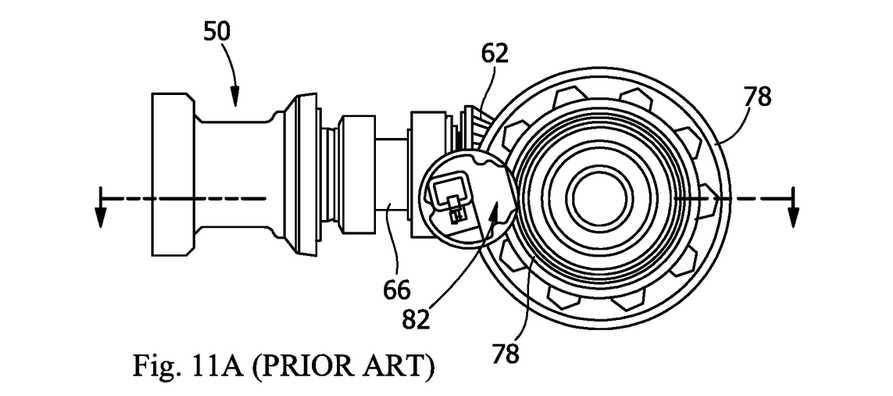
FIG. 11 is a view illustrating a related technology.
Figure 11B:
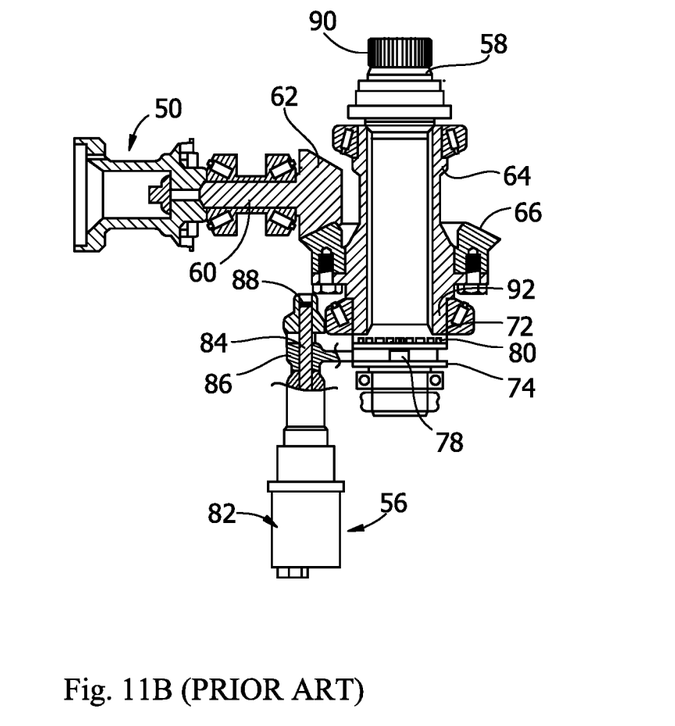

One example for this can be found in U.S. Pat. No. 8,469,854 as illustrated in FIG. 11.

In this example, a fork-sleeve structure and compact motor and decelerator are applied, as usually applied in a manual transmission.

The power generated from the compact motor 82 is passed through the transmission gear and rotates the shaft 84 such that the fork connecting member 86 and the fork 78 are moved by a feed screw present in the shaft and accordingly, the sleeve 74 connected thereto is also moved. Accordingly, when the input axis and the output axis having gear teeth in the circumferential direction reach a predetermined relative velocity difference, connection is made and the power is transmitted. Blocking the power is implemented as the compact motor 82 is rotated in the opposite direction such that operations are performed in a reverse order.

Meanwhile, it takes lengthy time for the compact motor 82 to reach desired torque and RPM. Further, because many connecting parts are involved, severe play and noise occur, the power transmission efficiency is deteriorated, and durability is also deteriorated. The applications in hybrid electrical vehicle (HEV)/electrical vehicle (EV) may especially suffer many problems as they particularly need a higher frequency of operating the disconnector.

DISCLOSURE OF INVENTION

Technical Problem

The present disclosure has been made to overcome the problems occurring in the art as described above, and accordingly, it is an object of the present disclosure to provide a connector which has an improved noise, vibration, durability, and so on, which is capable of transmitting a signal accurately without having electromagnetic wave interference, and so on, and which has a fast operation speed.

Solution to Problem

In an embodiment of the present disclosure, in order to solve the problems mentioned above, a connector is provided, which may include: a locking part formed on a main body; a latch to be in contact with the locking part; a first solenoid driving part disposed on one side of the latch; a second solenoid driving part disposed on the other side of the latch, in which the first solenoid driving part and the second solenoid driving part face each other, while having the latch interposed therebetween.

Further, the latch is disposed between a first spring and the locking part, in which the first spring is provided on one end of a fork sleeve that is formed on any one of the clutch disks installed at the main body.

Further, the locking part includes: a protruding part to be contacted with an end of the latch in a position where the latch is compressing the first spring to the maximum; a first inclined surface extended from the protruding part to one side, and a first surface extended from the first inclined surface; and a second inclined surface extended from the protruding part to the other side and a second surface extended from the second inclined surface, in which slopes of the first inclined surface and the second inclined surface are different, and heights of the first surface and the second surface are different.

Further, the clutch disk includes a first clutch disk having the fork sleeve formed thereon; and a second clutch disk facing the first clutch disk, in which a rotational axis of the first clutch disk is coupled by a spline, and a second spring is formed on an end of the rotational axis.

Further, at least one of the first solenoid driving part or the second solenoid driving part includes a position sensor.

Further, the position sensor is coupled with a rod of the first solenoid driving part or a rod of the second solenoid driving part.

Effects

As described above, according to the present disclosure, the following effects are obtained.

First, in a main body with the locking part formed thereon, because the first solenoid driving part and the second solenoid driving part are disposed to face each other, while having a latch to be latched onto the locking part interposed therebetween, the operation movement during the operation of the clutch can be simpler. As a result, noise, vibrations and durability can be improved.

Second, because the latch is disposed between the first spring and the locking part, in which the first spring is provided on one end of the fork sleeve formed at any one of the clutch disks installed at the main body, the latch can be pushed into a tighter contact with the locking part by the first spring. Accordingly, the advantage of securer fastening is provided.

Third, because the locking part has a first inclined part and a second inclined part extended from the protruding part to both sides at different angles from each other, and because a first surface extended from the first inclined part and a second surface extended from a second inclined part are offset to have a height difference therebetween, during clutch driving force connection, the latch can be slid over the protruding part with less force. Accordingly, response speed can be improved.

Fourth, among the clutch disks, because the rotational axis of the first clutch disk having the fork sleeve formed thereon is formed by a spline, and because there is a second spring provided on an end of the rotational axis, the impact generated during connection of the first clutch disk and the second clutch disk is absorbed.

Fifth, because at least one of the first solenoid driving part or the second solenoid driving part includes a position sensor, it is possible to accurately determine the operation of the clutch.

Sixth, because the position sensor is mechanical, it can provide accurate signal transmission without having error such as electromagnetic wave interference, and so on.

BEST MODE FOR THE INVENTION

The preferred embodiments will be described in detail with reference to the drawings.

In that process, the thicknesses of the lines illustrated in the drawings, sizes of the constituent elements, or the like may be exaggerated for the purpose of clarity and convenience. Further, the terms described below are those that are defined in consideration of the function of the present disclosure, and may be varied according to the intent or the practice of the user or the operator. Accordingly, the definitions of these terms should be described based on the content throughout the disclosure.

Figure 1:
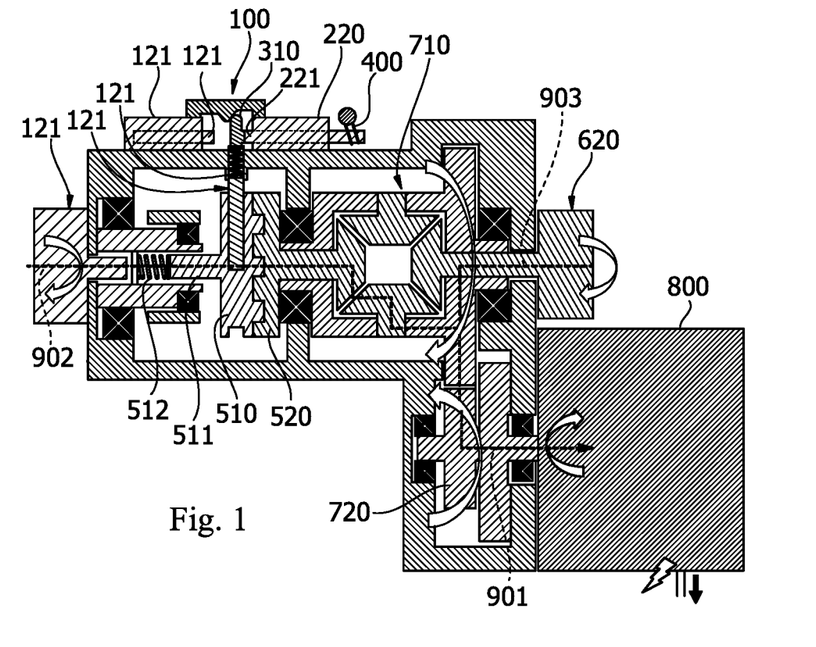
FIG. 1 illustrates a first clutch disk 510 and a second clutch disk 520 connected according to a preferred embodiment of the present disclosure.
Figure 2:
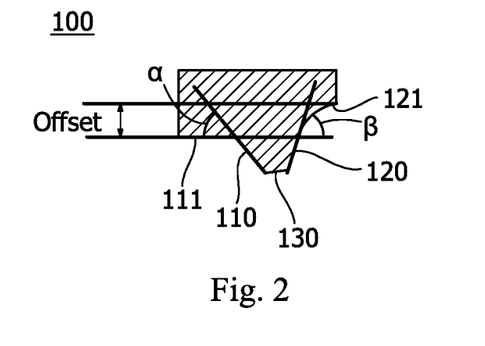
FIG. 2 is a cross-sectional view of a locking part 100 according to a preferred embodiment of the present disclosure.

FIG. 1 illustrates a first clutch disk 510 and a second clutch disk 520 connected according to a preferred embodiment of the present disclosure, and FIG. 2 is a cross-sectional view of a locking part 100 according to a preferred embodiment of the present disclosure.

Figure 3:
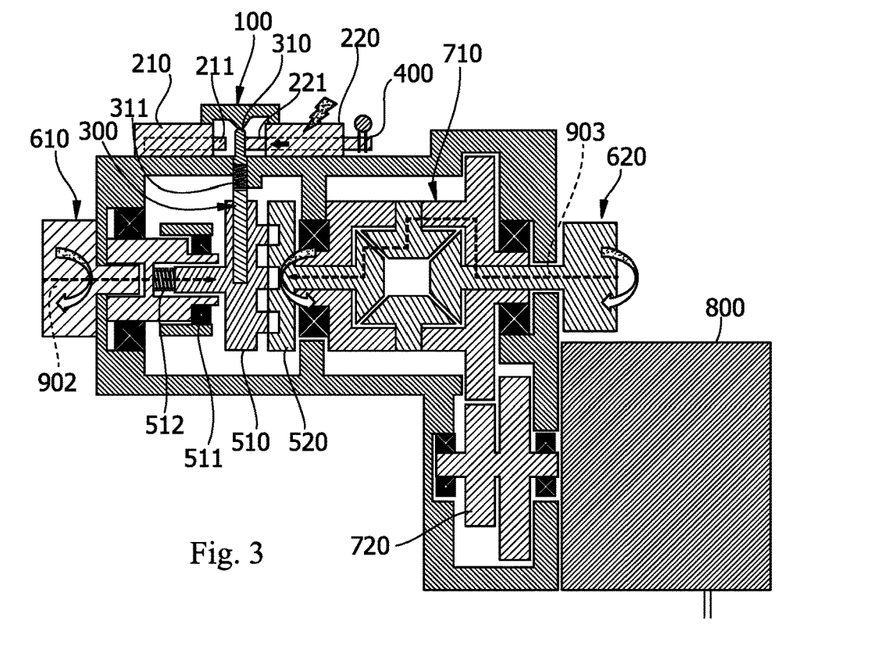
FIG. 3 is a view according to a preferred embodiment of the present disclosure illustrating that, as a second rod 221 pushes a latch 310 upon the operation of the second solenoid driving part 220, an end of the latch 310 is positioned at a protruding part 130 of the locking part 100, according to which the first clutch disk 510 and the second clutch disk 520 begin to separate from each other.

FIG. 3 is a view according to a preferred embodiment of the present disclosure illustrating that, as a second rod 221 pushes a latch 310 upon the operation of the second solenoid driving part 220, an end of the latch 310 is positioned at a protruding part 130 of the locking part 100, according to which the first clutch disk 510 and the second clutch disk 520 begin to separate from each other.

Figure 4:
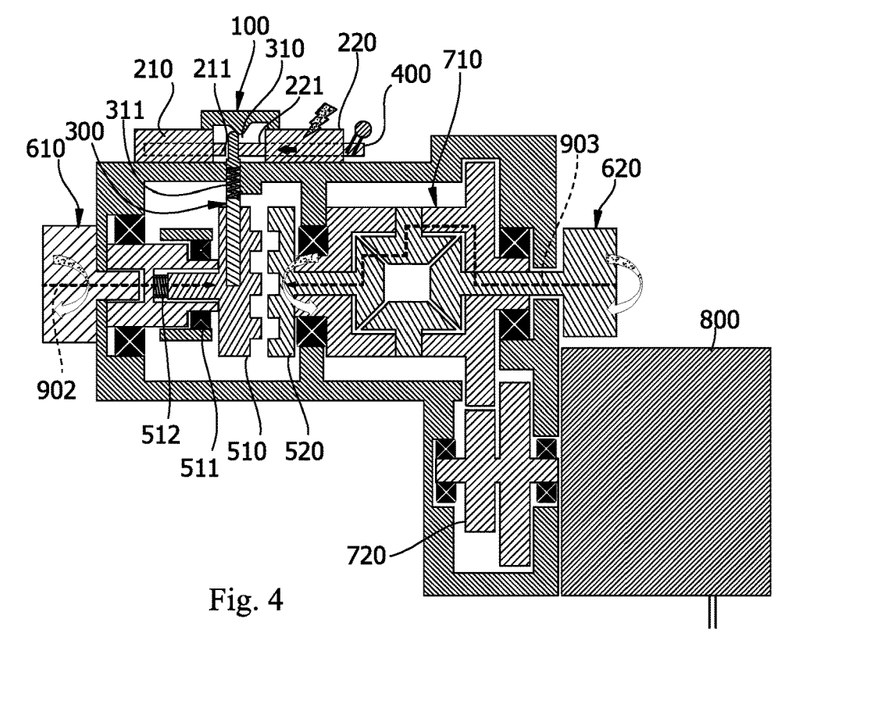
FIG. 4 is a view according to a preferred embodiment of the present disclosure illustrating that, as the second solenoid driving part 220 continues operating, the second rod 221 pushes the latch 310 such that the latch 310 is slid over the protruding part 130 formed on the locking part 100 and then contact the first rod 211 of the first solenoid driving part 210.

FIG. 4 is a view according to a preferred embodiment of the present disclosure illustrating that, as the second solenoid driving part 220 continues operating, the second rod 221 pushes the latch 310 such that the latch 310 is slid over the protruding part 130 formed on the locking part 100 and then contact the first rod 211 of the first solenoid driving part 210.

Figure 5:
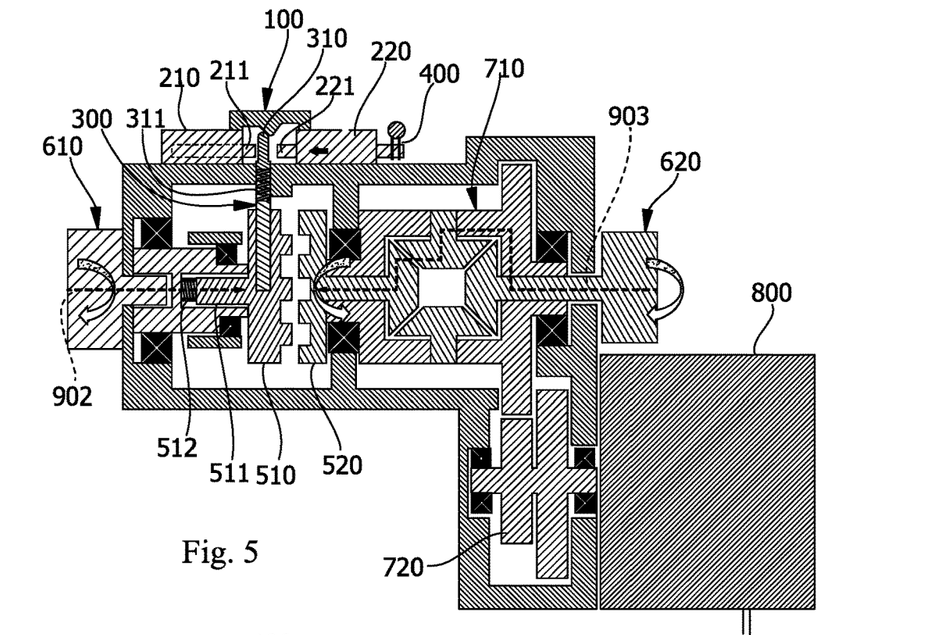
FIG. 5 is a view according to a preferred embodiment of the present disclosure, illustrating the first clutch disk 510 and the second clutch disk 520 being separated.

FIG. 5 is a view according to a preferred embodiment of the present disclosure, illustrating the first clutch disk 510 and the second clutch disk 520 being separated.

Figure 6:
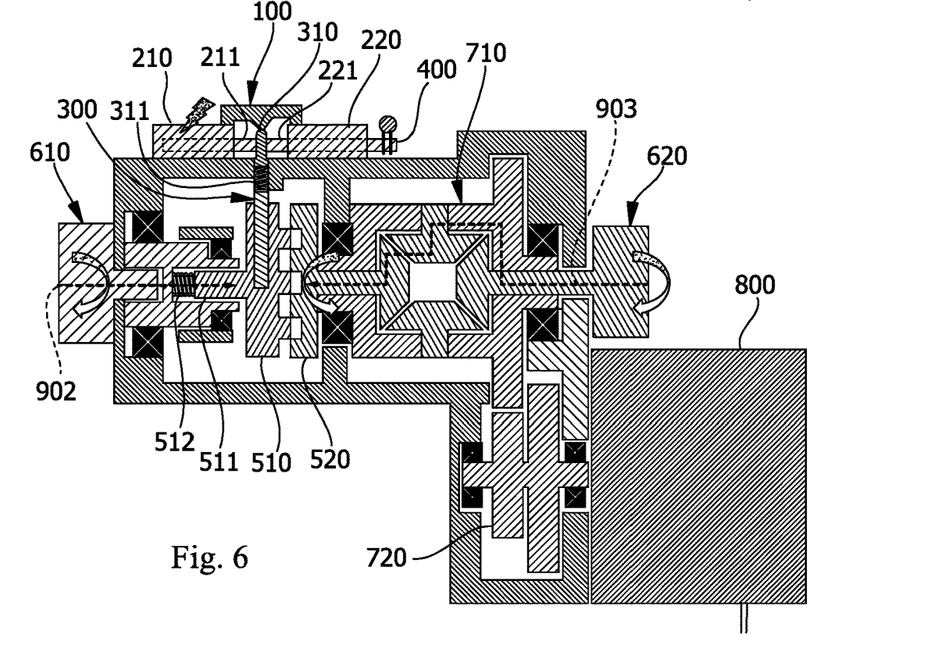
FIG. 6 is a view according to a preferred embodiment of the present disclosure, illustrating that, as the first solenoid driving part 210 operates and thus the first rod 211 pushes the latch 310, the latch 310 is brought into contact with the protruding part 130 formed on the locking part 100.

FIG. 6 is a view according to a preferred embodiment of the present disclosure, illustrating that, as the first solenoid driving part 210 operates and thus the first rod 211 pushes the latch 310, the latch 310 is brought into contact with the protruding part 130 formed on the locking part 100.

Figure 7:
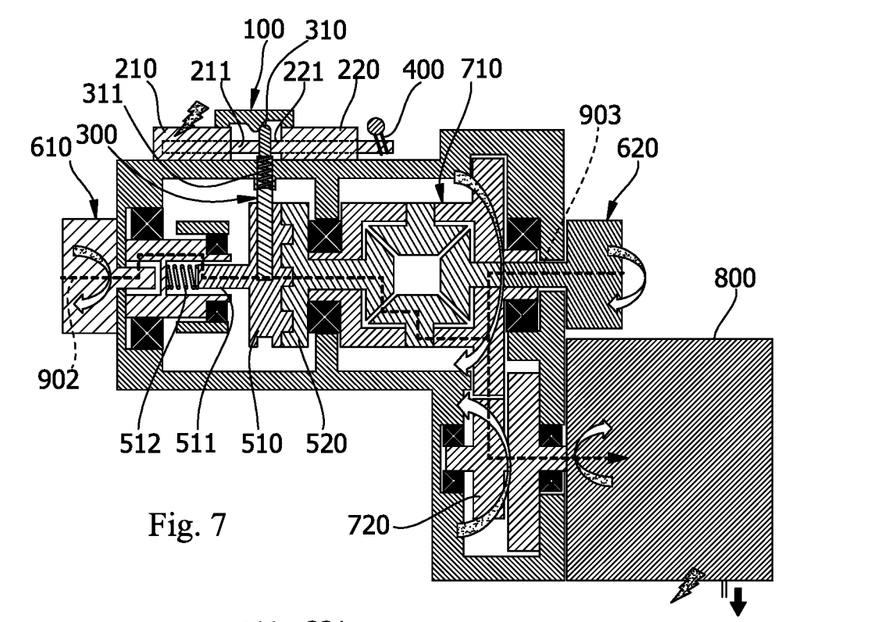
FIG. 7 is a view according to a preferred embodiment of the present disclosure, illustrating that, as the first solenoid driving part 210 continues operating and thus the first rod 211 pushes the latch 310, the latch 310 is slid over the protruding part 130 such that the first clutch disk 510 and the second clutch disk 520 are coupled with each other.

FIG. 7 is a view according to a preferred embodiment of the present disclosure, illustrating that, as the first solenoid driving part 210 continues operating and thus the first rod 211 pushes the latch 310, the latch 310 is slid over the protruding part 130 such that the first clutch disk 510 and the second clutch disk 520 are coupled with each other.

Figure 8:
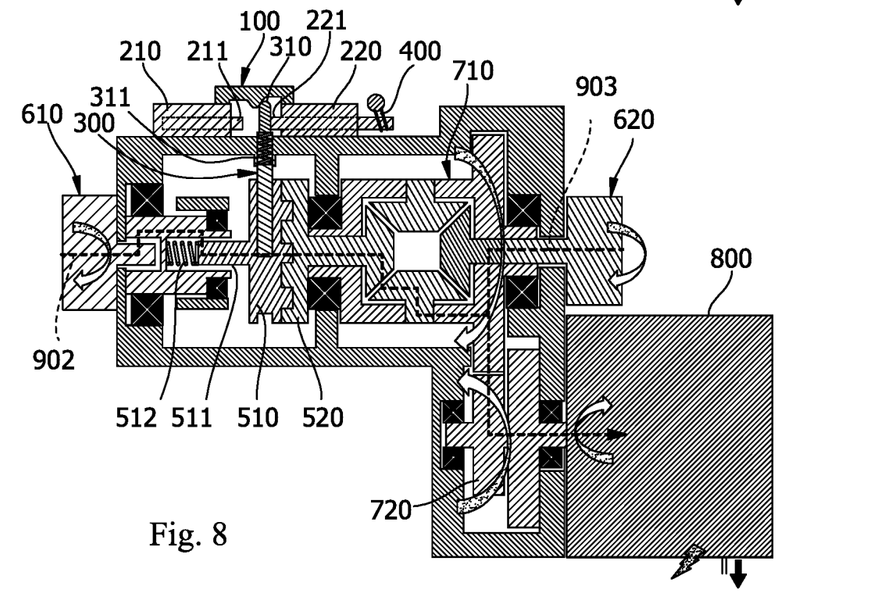
FIG. 8 is a view illustrating the first solenoid driving part 210 operated to an initial position, according to a preferred embodiment of the present disclosure.

FIG. 8 is a view illustrating the first solenoid driving part 210 operated to an initial position, according to a preferred embodiment of the present disclosure.

Figure 9:
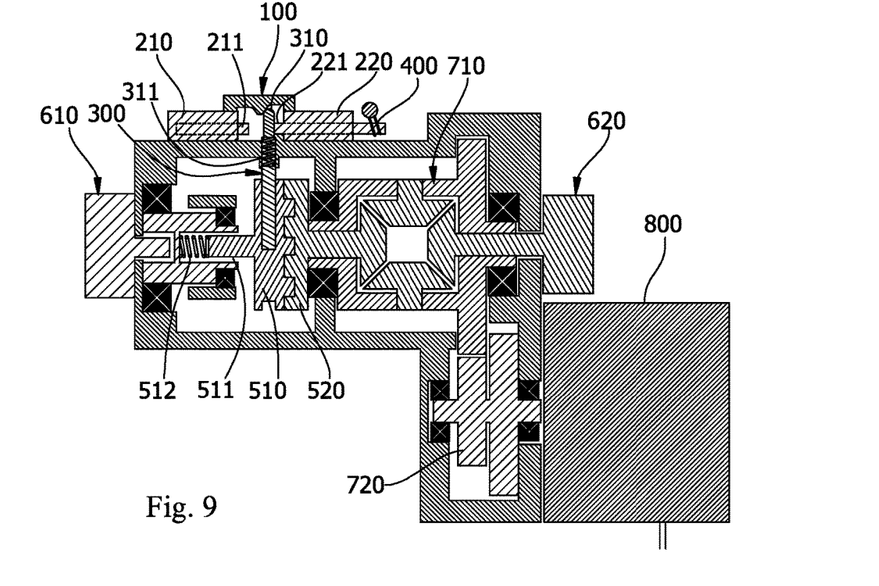
FIG. 9 is a view illustrating an operation according to a preferred embodiment of the present disclosure.
Figure 10:
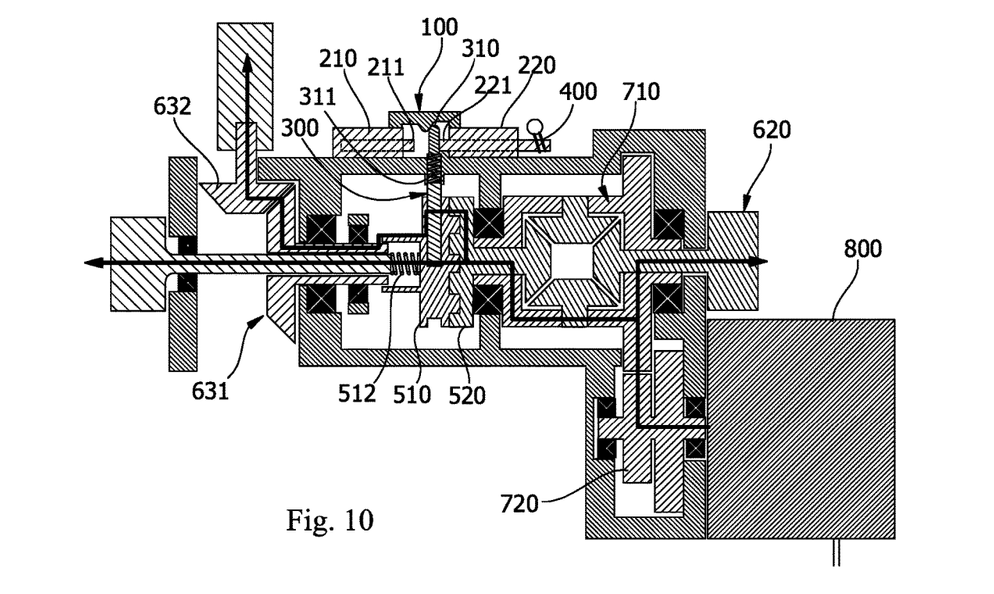
FIG. 10 is a view illustrating an operation according to another preferred embodiment of the present disclosure.

FIG. 9 is a view illustrating an operation according to a preferred embodiment of the present disclosure, and FIG. 10 is a view illustrating an operation according to another preferred embodiment of the present disclosure.

First, the overall configuration will be mentioned, and then detailed configuration will be described.

The locking part 100 is formed at the main body and the latch 310 is in contact with the locking part 100. The first solenoid driving part 210 is disposed on one side of the latch 310, and the second solenoid driving part 220 is disposed on the other side of the latch 310.

The first solenoid driving part 210 and the second solenoid driving part 220 face each other, while having the latch 310 interposed therebetween.

The latch 310 is disposed between a first spring 311 and the locking part 100, in which the first spring 311 is provided on one end of a fork sleeve 300 that is formed on any one of the clutch disks installed at the main body.

The locking part 100 has a protruding part 130 to be in contact with an end of the latch 310 at a position where the latch 310 compresses the first spring 311 to a maximum degree.

The first inclined surface 110 is extended from the protruding part 130 to one side, with the first surface 111 being extended from the first inclined surface 110.

The second inclined surface 120 is extended from the protruding part 130 to the other side, with the second surface 121 being extended from the second inclined surface 120.

It is preferable that the slopes of the first inclined surface 110 and the second inclined surface 120 are different, and the first surface 111 and the second surface 121 are formed at different heights.

The clutch disk includes a first clutch disk 510 where the fork sleeve 300 is formed, and a second clutch disk 520 facing the first clutch disk 510.

A rotational axis of the first clutch disk 510 is spline-coupled at a spline part 511, and a second spring 512 is formed at an end of the rotational shaft.

At least one of the first solenoid driving part 210 or the second solenoid driving part 220 includes a position sensor 400, and the position sensor 400 is preferably mechanical.

As illustrated in FIG. 1, in a state that the first clutch disk 510 and the second clutch disk 520 are connected, the latch 310 is adjacent to the second rod 221 and on the right side of the protruding part 130, and is latched onto the second inclined surface 120 of the protruding part 130. Accordingly, the driving force of the driving part 800 may be transmitted through the first path 901 to be applied onto the second constant velocity joint 620 and the first constant velocity joint 610.

At this time, because the first spring 311 provided on the fork sleeve 300 urges the latch 310 in a direction toward the second surface 121 of the locking part 100, the latch 310 may be kept being fastened with the locking part 100, and the position sensor 400 senses that the first clutch disk 510 and the second clutch disk 520 are connected to each other.

As illustrated in FIG. 3, when the second solenoid driving part 220 is operated, the second rod 221 pushes the latch 310 to the right side.

The latch 310 is slid along the second inclined surface 120 formed on the locking part 100 to be contacted with the protruding part 130, and the first spring 311 is in the maximum-compressed state.

At this time, the first clutch disk 510 and the second clutch disk 520 begin to separate from each other, and the transmission of the driving force to the first constant velocity joint 610 and the second constant velocity joint 620 is blocked through the second path 902 and the third path 903, respectively.

The position sensor 400 may preferably stand upright in a moment when the latch 310 is contacted with the protruding part 130 of the locking part 100.

The position sensor 400 may preferably be operated mechanically, as this could avoid electromagnetic wave interferences.

Meanwhile, when the second rod 221 pushes the latch 310 to the left side by the operation of the second solenoid driving part 220, the fork sleeve 300 with the latch 310 installed thereon is also pushed to the left side, and as a result, an end of the rotational axis of the first clutch disk 510 overcomes the elastic force of the second spring 512 such that the entire first clutch disk 510 having the fork sleeve 300 formed thereon is pushed to the left side.

As illustrated in FIG. 4, when the second solenoid driving part 220 continues operating and the second rod 221 keeps pushing the latch 310 to the left side, the latch 310 is slid over the protruding part 130 formed on the locking part 100 and slid downward along the first inclined surface 110 to be finally positioned on the first surface 111.

Because the first spring 311 is urging the latch 310 in a direction toward the second surface 121, even when the operation of the second solenoid driving part 220 stops, the latch 310 cannot slid over the protruding part 130, but latched onto the first inclined surface 110 of the protruding part 130 and fastened thereon.

As described, when the first clutch disk 510 and the second clutch disk 520 are completely separated as illustrated in FIG. 4, the position sensor 400 is changed from the upright position and tilted to a certain side, thus sensing that the first clutch disk 510 and the second clutch disk 520 are completely separated.

As illustrated in FIG. 5, when the second rod 221 is separated apart from the latch 310 and returned to the initial position, the position sensor 400 is returned to the upright position.

In contrast, when the first solenoid driving part 210 is operated as illustrated in FIG. 6, the first rod 211 pushes the latch 310 to the right side such that the latch 310 is slid over the first inclined surface 110 to be contacted with the protruding part 130. As a result, the first clutch disk 510 and the second clutch disk 520 are almost coupled with each other.

The first solenoid driving part 210 can be driven with a less force, and this is because the first inclined surface 110 is inclined smoother than the second inclined surface 120 and also is subject to the elastic force of the second spring 512 provided at the end of the rotating axis of the first clutch disk.

Accordingly, the first clutch disk 510 can approach to the second clutch disk 520 very quickly.

In other words, the first clutch disk 510 can receive the power of the driving part 800 very quickly.

Meanwhile, the impact such as repulsive force and so on that is generated in the moment the first clutch disk 510 is contacted with the second clutch disk 520 is alleviated by the second spring 512.

When the first solenoid driving part 210 continues operating, the first rod 211 further pushes the latch 310 to the right side, and as a result, the latch 310 is moved out of the contact with the protruding part 130 to be slid over the protruding part 130 and along the second inclined surface 120 to be contacted with the second rod 221, as illustrated in FIG. 7.

When the latch 310 pushes the second rod 221 to the right side, the position sensor 400 connected to the second rod 221 is moved from the upright position and tilted such that the position sensor 400 can perceive that the first clutch disk 510 and the second clutch disk 520 are coupled and the driving force is transmitted through the first path 901.

When the first solenoid driving part 210 stops operating, as illustrated in FIG. 8, the first rod 211 is separated apart from the latch 310 and returned to the initial position.

As described above, the connector according to the present disclosure is preferably applied for use with a rear wheel driving module of a general four-wheeled vehicle, or an electrical vehicle (EV), or a hybrid electrical vehicle (HEV).

According to yet another embodiment of the present disclosure, the connector may have the same structure as the principles mentioned above, but may additionally include a driving gear part 631 spline coupled with the rotating axis of the first clutch disk 510, and a driven gear part 632 geared with the driving gear part 631.

The driven gear part 632 is connected to a propeller shaft 630 that transmits driving force to the rear wheel, to thus apply the driving force of the driving part 800 to the rear wheel through a fourth path 904.

The main body includes a differential part 710 and a deceleration gear part 720.

The foregoing exemplary embodiments and advantages are merely exemplary and a variety of modifications may be enabled without departing from the technical scope of the present disclosure. Accordingly, the present teaching is not to be construed as limiting the exemplary embodiments. The present teaching is to be interpreted by the claims appended hereto, and all the technologies within the equivalent scope are to be interpreted as being included in the scope of the present disclosure.

What is claimed is:

1. A connector, comprising:
   a locking part formed on a main body;
   a latch to be in contact with the locking part;
   the latch is disposed between a first spring and the locking part;
   the first spring is provided on one end of a fork sleeve that is formed on any one of clutch disks installed at the main body;
   the locking part comprising:
     a protruding part to be contacted with an end of the latch in a position where the latch is compressing the first spring;
     a first inclined surface extended from the protruding part to one side, and a first surface extended from the first inclined surface; and
     a second inclined surface extended from the protruding part to the other side and a second surface extended from the second inclined surface, wherein slopes of the first inclined surface and the second inclined surface are different, and heights of the first surface and the second surface are different;
   a first solenoid driving part disposed on one side of the latch;
   a second solenoid driving part disposed on the other side of the latch, wherein the latch being movable relative to the locking part between a first position in which the latch is in engagement with the first solenoid driving part and a second position in which the latch is in engagement with the second solenoid driving part;
   the first solenoid driving part and the second solenoid driving part facing each other, while having the latch interposed therebetween; and
   during movement between the first position and the second position the latch is not simultaneously engaged with the first solenoid driving part and the second solenoid driving part.

2. The connector of claim 1, wherein the clutch disk comprises:
   a first clutch disk having the fork sleeve formed thereon; and
   a second clutch disk facing the first clutch disk, wherein a rotational shaft of the first clutch disk is spline-coupled by a spline part, and a second spring is formed on an end of the rotational shaft.

3. The connector of claim 1, wherein at least one of the first solenoid driving part or the second solenoid driving part includes a position sensor.

4. The connector of claim 3, wherein the position sensor is coupled with a rod of the first solenoid driving part or a rod of the second solenoid driving part.

5. A connector, comprising:
   a locking part formed on a main body;
   a latch to be in contact with the locking part;
   the latch is disposed between a first spring and the locking part;
   the first spring is provided on one end of a fork sleeve that is formed on any one of clutch disks installed at the main body;
   the clutch disk comprising:
     a first clutch disk having the fork sleeve formed thereon; and
     a second clutch disk facing the first clutch disk;
   wherein a rotational shaft of the first clutch disk is spline-coupled by a spline part, and a second spring is formed on an end of the rotational shaft;
   a first solenoid driving part disposed on one side of the latch;
   a second solenoid driving part disposed on the other side of the latch, wherein the latch being movable relative to the locking part between a first position in which the latch is in engagement with the first solenoid driving part and a second position in which the latch is in engagement with the second solenoid driving part;
   the first solenoid driving part and the second solenoid driving part facing each other, while having the latch interposed therebetween; and
   during movement between the first position and the second position the latch is not simultaneously engaged with the first solenoid driving part and the second solenoid driving part.

6. The connector of claim 5, wherein the locking part comprises:
   a protruding part to be contacted with an end of the latch in a position where the latch is compressing the first spring to the maximum;
   a first inclined surface extended from the protruding part to one side, and a first surface extended from the first inclined surface; and
   a second inclined surface extended from the protruding part to the other side and a second surface extended from the second inclined surface, wherein slopes of the first inclined surface and the second inclined surface are different, and heights of the first surface and the second surface are different.

7. The connector of claim 5, wherein at least one of the first solenoid driving part or the second solenoid driving part includes a position sensor.

8. The connector of claim 7, wherein the position sensor is coupled with a rod of the first solenoid driving part or a rod of the second solenoid driving part.

* * * * *